(12) United States Patent
Stechmann

(10) Patent No.: US 9,252,581 B2
(45) Date of Patent: Feb. 2, 2016

(54) CABLE MOUNTING BRACKET SYSTEM

(71) Applicant: Eric Stechmann, Liberty, MO (US)

(72) Inventor: Eric Stechmann, Liberty, MO (US)

( * ) Notice: Subject to any disclaimer, the term of this patent is extended or adjusted under 35 U.S.C. 154(b) by 0 days.

(21) Appl. No.: 14/252,629

(22) Filed: Apr. 14, 2014

(65) Prior Publication Data
US 2014/0306071 A1 Oct. 16, 2014

Related U.S. Application Data

(60) Provisional application No. 61/811,424, filed on Apr. 12, 2013.

(51) Int. Cl.
*F16L 3/00* (2006.01)
*H02G 3/32* (2006.01)

(52) U.S. Cl.
CPC ...................................... *H02G 3/32* (2013.01)

(58) Field of Classification Search
USPC ............... 248/62, 65, 71, 73, 206.5, 74.1
See application file for complete search history.

(56) References Cited

U.S. PATENT DOCUMENTS

| 5,623,801 | A | * | 4/1997 | Drumbl | 52/514 |
| 7,354,360 | B1 | * | 4/2008 | Eckstein | 473/417 |
| 8,235,235 | B1 | * | 8/2012 | Lusch | 220/230 |
| 8,413,734 | B2 | * | 4/2013 | Silcox et al. | 169/43 |
| 8,523,120 | B2 | * | 9/2013 | Asano et al. | 248/68.1 |

* cited by examiner

*Primary Examiner* — Gwendolyn W Baxter
(74) *Attorney, Agent, or Firm* — Lathrop & Gage LLP

(57) ABSTRACT

A bracket and a cable mounting system which includes a bracket with at least two legs, which is angled to match the radius of a structure to which the bracket is to be applied. The bracket has at least one hole in the center panel for securing a component to the bracket. The bracket can have magnetic pads located on the distal end of the legs so that the bracket may be attached to a structure by magnetic force. The cable mounting system may also consist of two brackets a distance apart and a support rail placed in between the brackets and coupled to the brackets.

17 Claims, 9 Drawing Sheets

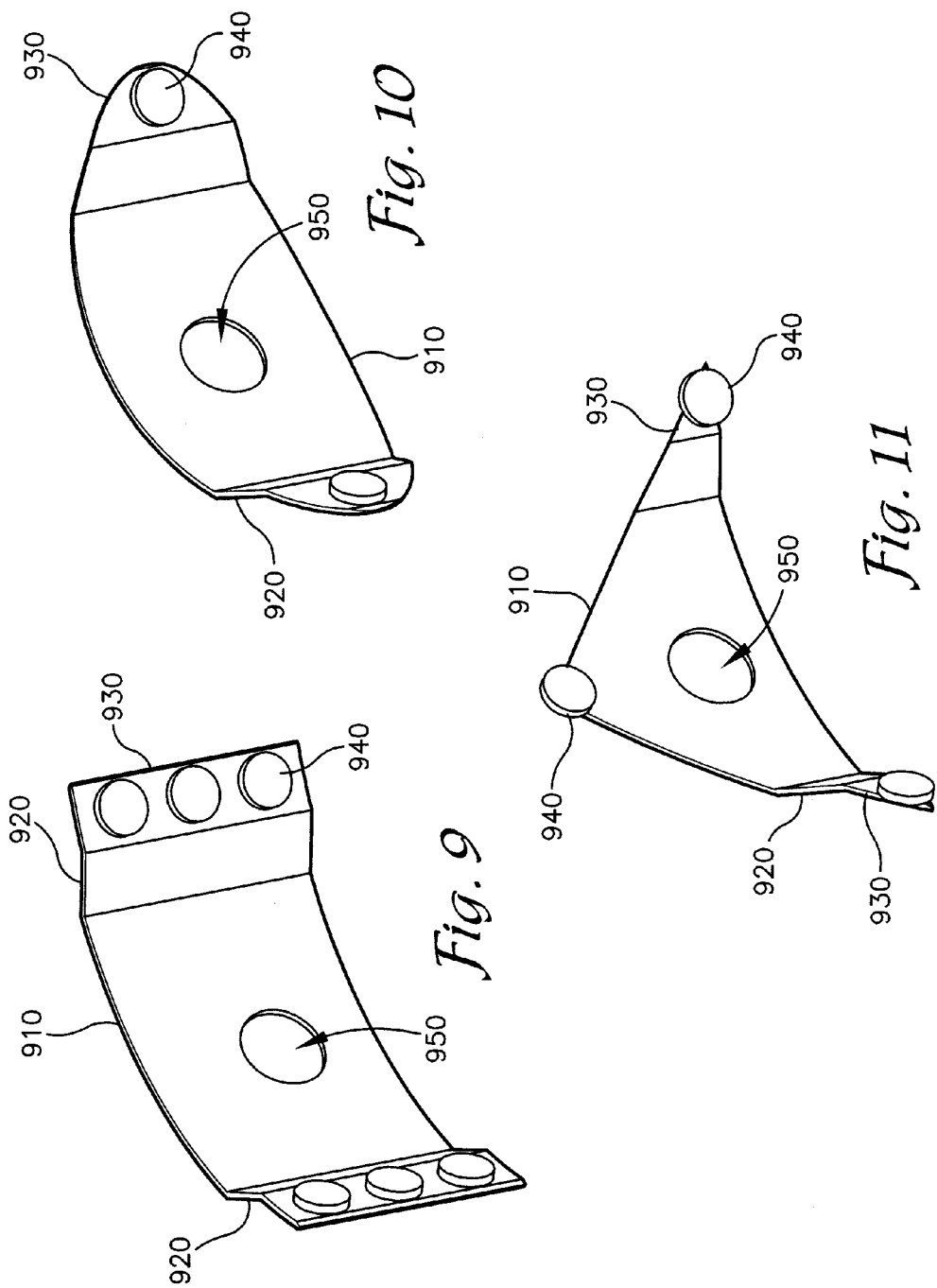

CABLE MOUNTING BRACKET SYSTEM

RELATED APPLICATION

This application claims the benefit of priority to U.S. Provisional Application No. 61/811,424 filed Apr. 12, 2013.

FIELD OF THE INVENTION

This disclosure relates to brackets and mounting systems. More specifically, this disclosure concerns brackets and mounting systems used in elevated locations that are exposed to the outdoor and immersive areas.

BACKGROUND OF THE INVENTION

Historically, equipment from communication and electrical installations including; coaxial cables, conduit, wires, and other components which vertically traverse elevated structures have been fastened directly to worker access structures including; ladders, ladder cages, and hand rails. These structures have provided an immediate structure for equipment fastening. However, this type of installation has historically presented unsafe working conditions for the workers by obstructing and encumbering movement and rescue throughout access areas. Additionally, these installations may cause maintenance and/or structural damage when installed on areas which lack initial design and structural capability. Aside from fastening communication devices onto the aforementioned areas, a traditionally more acceptable installation includes welding or banding of communication brackets and raceways along the length of vertical steel. Many of these installations, however, have historically been of high cost and are associated with additional safety, structural, and maintenance issues.

The United States Occupational Safety and Health Administration's (OSHA) current regulations stipulate against specific obstructive encumbrances upon or within worker or rescuer access areas. Other national U.S. and state agencies also provide regulatory and design stipulations further prohibiting obstructions into and within these areas. More specifically, traditional fastening of communication and electrical equipment onto areas such as ladders encumber the fluid motion of the workers' hands when grasping and transitioning along the side-rails. Fastening devices such as clamps and bolted connections commonly encumber foot placement on rungs and further create abrasion risks for the worker or rescuer. Many coaxial cables used in the telecommunication industry emit radio-frequency waves. When workers and rescuers are subjected to these close-proximity coaxial cable installations they face exposure to radio-frequency waves which are known to cause bodily harm.

Elevated steel structures and associated access structures are commonly coated with expensive corrosion resistant high performance materials in order to limit corrosion through environmental exposure to the steel. Many of these materials need to be maintained according to industry standards derived from the Society for Protective Coatings, the National Association of Corrosion Engineers, and the American Water Works Association. When scheduled for routine maintenance and renovation work many of the aforementioned traditional fastening methods are difficult to temporarily move off of or away from the steel. In some cases coordination of a temporary removal of the communication equipment may allow for a non-obstructed steel structure during its time of maintenance. Many of these cables and antennae are temporarily re-erected onto a Cell-On-Wheels (C.O.W.) which is usually an expensive and logistically difficult scenario. Due to the cost of the telecommunication equipment and ownership, many steel structure maintenance providers are prohibited from adjusting the equipment. When temporary removal of many of the aforementioned fastening methods are not accomplished fastened cabling equipment in close proximity to the coated steel surface receives a reduced level of surface preparation and coating application. Furthermore, many installations accelerate abrasion and corrosion to the structure by inducing cyclic abrasive action between coatings and fastening connections and by increasing the moisture content below and adjacent to the fastening area.

A traditional method of fastening communications equipment away from access areas includes weld-fastening coated steel stand-off brackets in series along the structural steel body. The cables can then be secured to these firmly welded "stand-off" brackets. Welding steel brackets onto the structure, especially an existing structure, is usually expensive, time intensive, requires specialized equipment and certification. In the case of weld-fasting onto a coated steel structures, the installation procedure must include grinding of the coatings and steel in the areas of welding. This creates a breach in the homogenous corrosion resistance application to the steel which may cause accelerated corrosion. Additionally, high temperatures induced from welding and grinding cause burning to the coatings. Proper repair of these areas include grinding of all affected areas to fresh steel and re-application of one or multiple coating layers which must also be matched for color and chemical compatibility. The obverse side of the weld application is often heat damaged and must also be properly surface repaired. Traditionally, the obverse side of many of these installations are left inadequately or completely devoid of proper repair.

Steel surfaces to which fastening must be accomplished between communication equipment and the steel surfaces vary greatly according to radius and angled corners. While welded "stand-off" brackets come in a variety of shapes and sizes, they are not specifically designed to tangentially surface match with these curves and angles of the underlying steel structure. Thus, these existing one-size-fits-all brackets do not maximize the surficial contact areas in order to provide the maximum amount application stability. Previous designs also create sharp contact areas which regularly cause sharp abrasion pinch-points to underlying coatings. Additionally, many of these brackets also create high aspect ratios which create a top-heavy high profile connection which may structurally fail when induced to seasonal external environmental forces such as wind and ice dynamic loading characteristic of elevated structures.

SUMMARY OF THE INVENTION

The present disclosed technology consists of a bracket, as well as an improved mounting system for securing components to an elevated steel structure. The bracket has at least two legs which are angled to tangentially match the radius of the structure to which the bracket is applied. This allows for increased surficial contact area between the distal end of the leg and the structure. Additionally, the bracket has a center panel into which exists at least one hole which receives industry standard "snap-in" cable fasteners, bolts, and other fastening devices. In one embodiment, the bracket has four legs and at least one hole in each distal end of the leg by which it may be attached to a structure by a screw, bolt, or other fastening device.

In a second embodiment, the bracket has at least two angled legs and at least one magnetic pad attached to each distal end of each leg of the structure. The magnetic pad is comprised of a magnet firmly embedded into a corresponding socket. The magnet is solidly fixed in the steel socket, and the bracket can then be magnetically secured to a structure comprising a ferrous material through magnetic force.

In a third embodiment, the bracket has a low aspect ratio. This provides for a more stable bracket against exposure to the external forces common to elevated structures. In a fourth embodiment, the bracket has at least one hole in each of the at least two legs for the purpose of securing a cable using cable clamps, bolts, or other fastening devices.

The brackets may also be inter-connected to one another along their traverse though connecting a series of rigid rails onto one or more fastening locations along the structure of the bracket.

BRIEF DESCRIPTION OF THE DRAWINGS

FIG. 9 is a perspective view of an embodiment of the bracket;

FIG. 10 is a perspective view of an embodiment of the bracket; and

FIG. 11 is a perspective view of an embodiment of the bracket.

DEFINITIONS

As used herein the following terms have the following meanings:

The term "distal end" shall mean the end of the bracket leg that is most distant from the center panel of the bracket.

The term "aspect ratio" refers to the ratio of the height of the bracket when placed on a flat surface in relation to the distance from one distal end of a leg to the distal end of a leg on the opposite side of the bracket. For example, a bracket that measures 14 inches from distal end to distal end and that has a height of 4 inches from the center panel to a flat surface would have an aspect ratio of 4:14, or 28.6%.

The term "radius of curvature" shall mean the radius of a circle that best fits the curve at that point on the structure.

DETAILED DESCRIPTION

The disclosed technology is directed to a bracket that is curved so that the curvature of the distal end of the legs is matched to the tangential radius or angle of the structure, such as a water tower, that the bracket will be secured to. The surface of the structure can be concave, convex, or form any number of angles. The bracket has at least one hole in the center panel, at least two legs that extend outwardly and downwardly from the center panel, and a distal end at each of the legs where the curvature of the legs is matched to the curvature of the structure to which the bracket is applied.

According to OSHA regulations at 29 CFR 1910.27(d)(1)(vi), ladder wells are to have a clear width of at least 15 inches measured each way from the centerline of the ladder. Smooth-walled wells shall be a minimum of 27 inches from the centerline of rungs to the well wall on the climbing side of the ladder. Where other obstructions on the climbing side of the ladder exist, there shall be a minimum of 30 inches from the centerline of the rungs. According to the OSHA regulations at 29 CFR 1910.27(c)(4), the distance from the centerline of rungs, cleats, or steps to the nearest permanent object in back of the ladder shall be not less than 7 inches, except that when unavoidable obstructions are encountered. It is these federal regulations that limit the use of ladders for purposes of securing cable traverses and facilitate the use of the disclosed technology that can be secured to the structure proximate the ladder but sufficiently far away to avoid noncompliance with the federal regulations.

Figure 1:
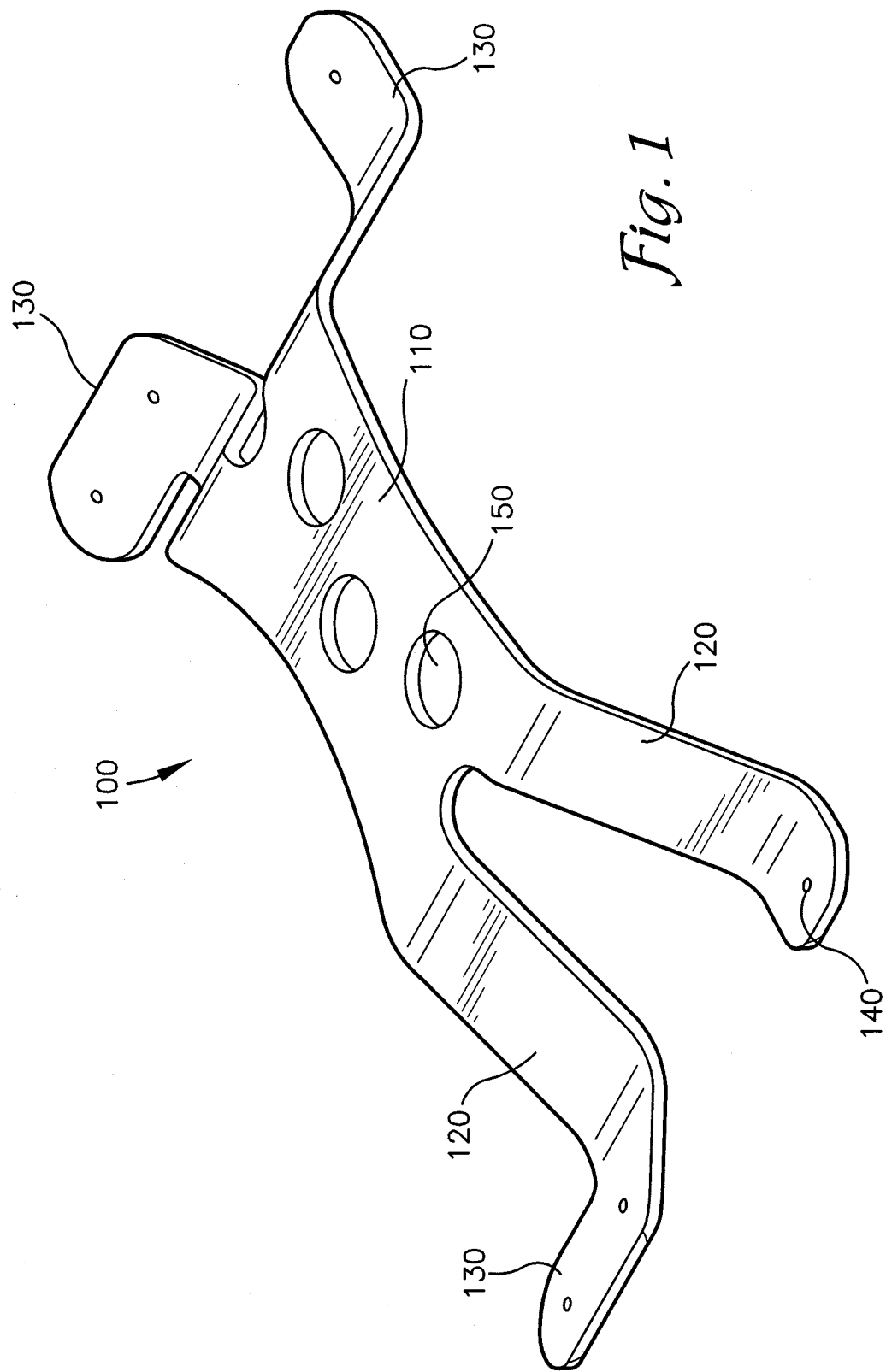
FIG. 1 is a perspective view of an embodiment of the bracket.

As shown in FIG. 1, a first embodiment of the bracket 100 disclosed herein is comprised of a center panel 110 and four legs 120. The distal end of each leg 130 contains at least one hole 140 through which a fastening device may be passed through and the bracket 100 may be adhered to a structure. The bracket 100 is preferably fabricated from a 10 gauge stainless steel alloy, such as austenitic 304 stainless steel. 304 stainless steel is composed of a minimum of 18% chromium and 8% nickel, combined with a maximum of 0.08% carbon. The legs 120 extend outwardly and downwardly to create a bracket with a wide stance and a low aspect ratio. The hole in the center panel 150 has a diameter preferably in the range of 0.25 to 0.85 inches in order to facilitate engagement with industry standard "snap-in" cable clamps, bolts, flexible fasteners such as zip ties, or other fastening devices to secure components.

Because the curvature of the distal ends of the legs of the bracket are closely matched to the radius of curvature of the structure a high percentage of the designated surface of the legs of the bracket are in contact with the surface of the structure. Specifically, a designated portion of the legs are intended to engage the surface of the structure and maximizing that surface contact creates a more powerful hold. The surficial contact between the designated portion of the leg typically ranges between 50 and 100% and therefore improves the capacity of the bracket to withstand forces seeking to separate the bracket, i.e., wind shear and ice loading, from the building. Alternatively, the legs of a bracket may engage the surface of the structure along a tangential line of contact if the surface of the structure is highly curved and thereby limits the scope of surficial contact.

Figure 2:
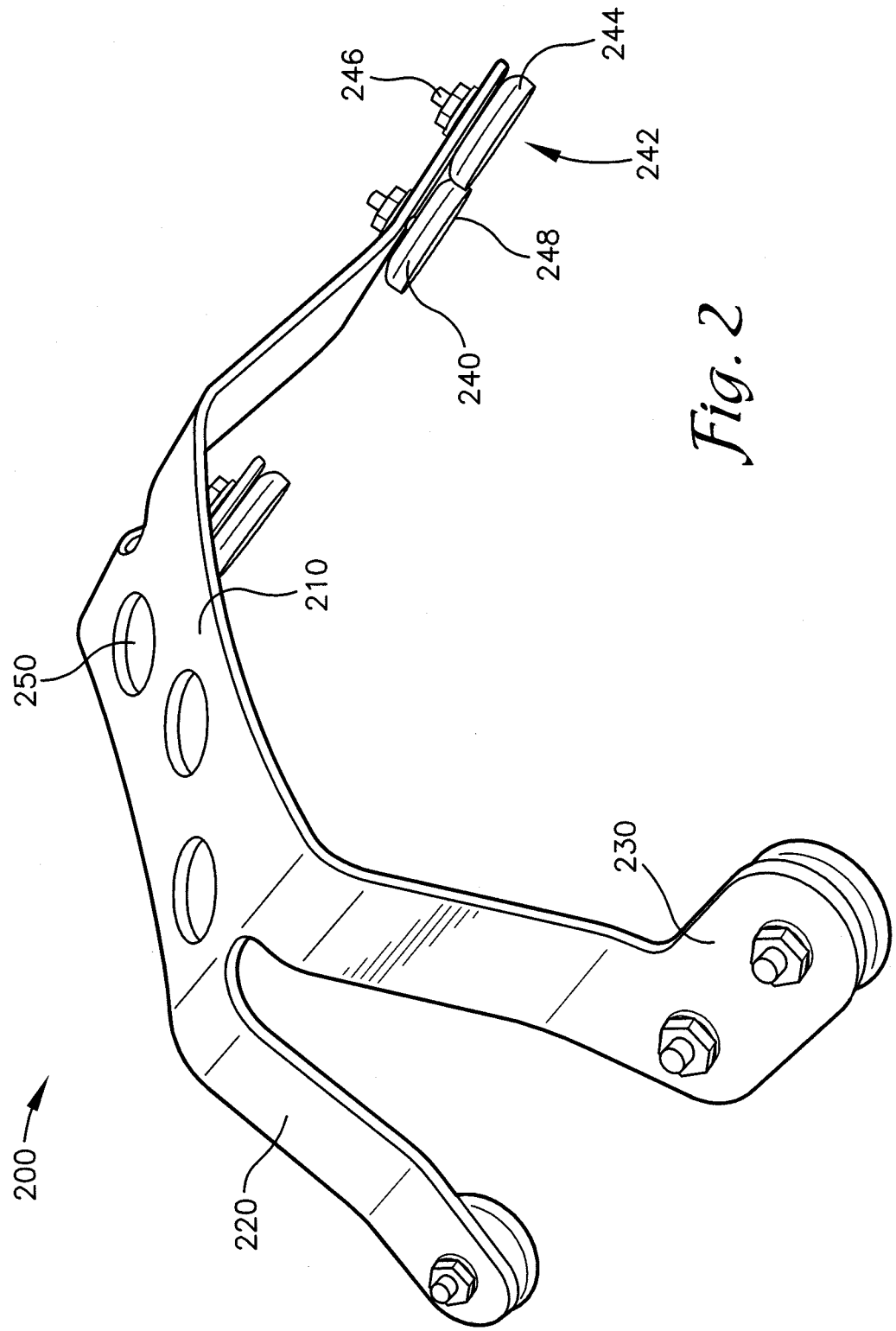
FIG. 2 is a perspective view of an embodiment of the bracket with magnetic pads attached at the distal end of the legs.

As shown in FIG. 2, a second embodiment of the bracket 200 disclosed herein is comprised of a center panel 210, four legs 220, at least one hole in the center panel 250, and at least one magnetic pad 240 attached to the distal end of each leg 230. The bracket 200 is preferably fabricated from a 10 gauge stainless steel alloy, such as austenitic 304 stainless steel. 304 stainless steel is composed of a minimum of 18% chromium and 8% nickel, combined with a maximum of 0.08% carbon. The bracket 200 can then be detachably secured through magnetic force to a structure comprised of a ferrous material.

One embodiment of the magnetic pad 240 is comprised of a neodymium alloy magnet 242 and corrosion resistant steel socket 244 with a corrosion resistant stem 246. Neodymium magnets generally have the greatest magnetic field strength per weight ratio of permanent magnets currently and commonly available. The magnetic pads 240 are attached to the distal end of each leg 230 of the bracket 200 either by threading the stem 246 or by pushing the stem 246 through the structure of the bracket and subsequently securing the magnet assembly with a combination of locking washer, locking nut and/or chemical locking compound so that the magnetic pads 240 are solidly fixed. The steel socket 244 encases the magnet 242 and tends to magnetically focus the magnetic field into the ferrous surface to which the bracket 200 is attached. In operation, the rim of the socket 248 as well as the magnet 242 itself contacts the structure creating a broader surface area contact providing additional mitigation against sheer force. A magnet's pull force is based on many considerations, such as the diameter and thickness of the magnet, the grade of the magnet, and the distance the magnet is from a ferrous material. The magnets utilized in the disclosed technology may individually have a pull force of 60-120 lbs when connected closely and tangentially to a ferrous steel structure of substantial steel thickness.

For additional strength and support, the surface area of magnetic pads 240 and the points of contact are spread to the distal end of each of the four legs 230. Multiple magnetic pads 240 may be affixed to the distal end of each of the four legs 230 to increase the resistive sheer, moment, and vertical pull forces imposed onto the affixed bracket.

The bracket 200 with magnetic pads 240 is adjustable and easily removable. The bracket 200 can be applied in any weather condition. Additionally, the bracket 200 is hand attachable and hand removable, though tool application may be used.

Figure 3:
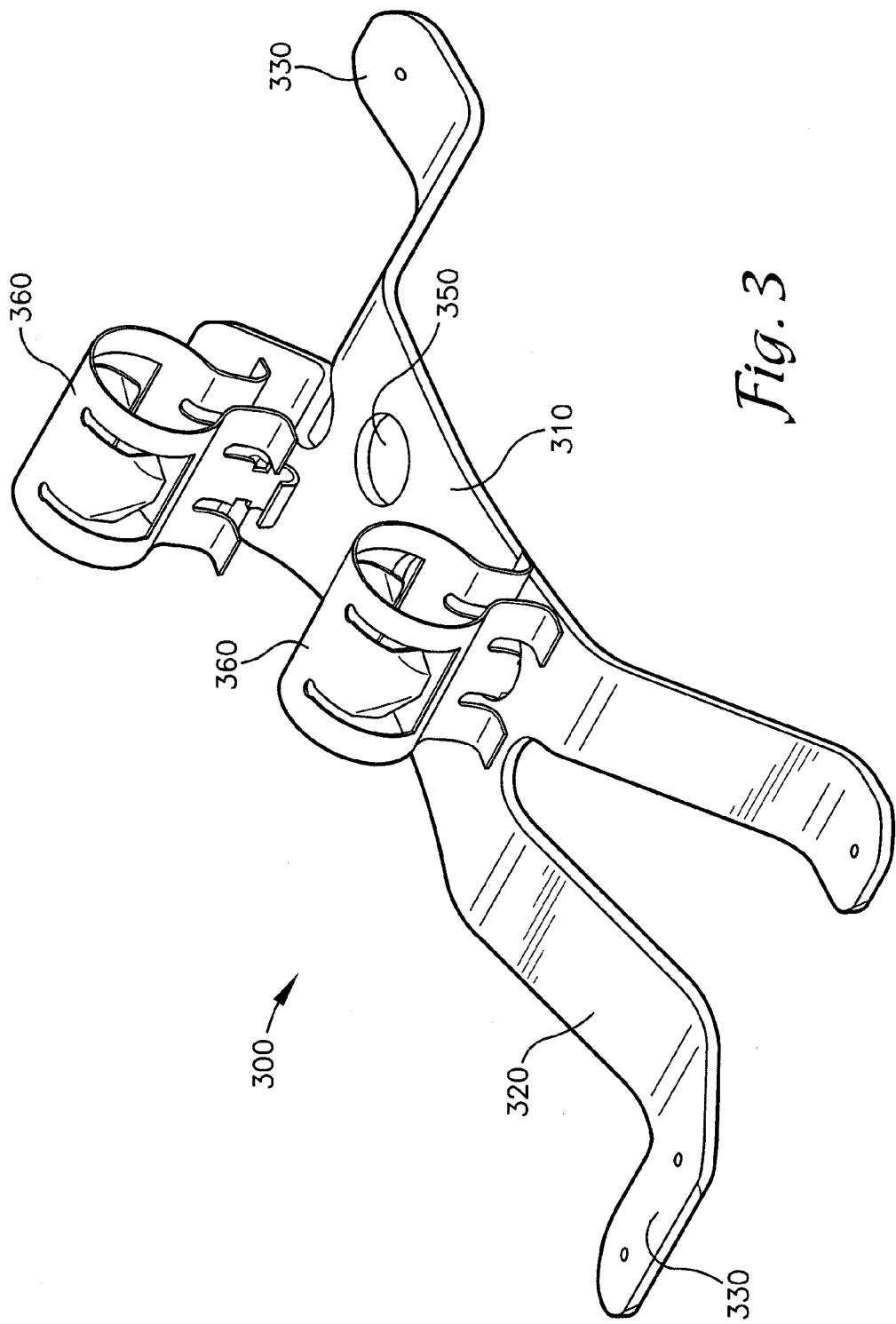
FIG. 3 is a perspective view of an embodiment of the bracket utilizing a clamp embodiment for attaching components to the bracket.

As seen in FIG. 3, a preferred embodiment of bracket 300 disclosed herein has an aspect ratio of between 15% and 75%. An optimum open gap exists between the center panel 310 of the bracket 300 and the underlying structure. This improves aesthetics and maintenance operations. Four legs 320 extend outwardly and downwardly from the center panel 310 to create a wide stance and allow the bracket to maintain a low profile. This wide stance also increases the moment force stability of the bracket. If magnetic pads (see FIG. 2, 240) are affixed to the distal end of the legs 330, the wide stance compliments the holding force of the magnets by lowering the center of gravity of the bracket and thus reducing the length of the moment arm. The hole in the center panel 350 may be between 0.25 and 0.85 inches to receive industry standard "snap-in" cable clamps 360.

The low aspect ratio exhibited on bracket 300 mitigates several forces by reducing the bracket's structural moment arm. Reduction in both static forces from sheer weight of the cabling system and also from dynamic forces induced from wind and other cyclic forces combine in improving the reliability of the fastening security to the structure. Elevated structures are exposed to unique external forces, such as high wind speeds and wind-driven precipitation which can apply substantial loads to the cable bracketing system.

Additionally, the bracket 300 may be utilized where components extend horizontally across a structure, such as a bridge, as well as where components traverse elevated structures.

In some embodiments, cable "snap-in" fasteners may have an opening in a center panel at the top of the fastener, wherein another cable fastener may be received into the top of the underlying "snap-in" cable fastener. The brackets may be sized and built to accommodate this increase in load forces. The cable clamps 360 can accommodate hard installations or flexible cables. Additionally, the cable clamps may be installed manually or with a tool application.

Figure 4:
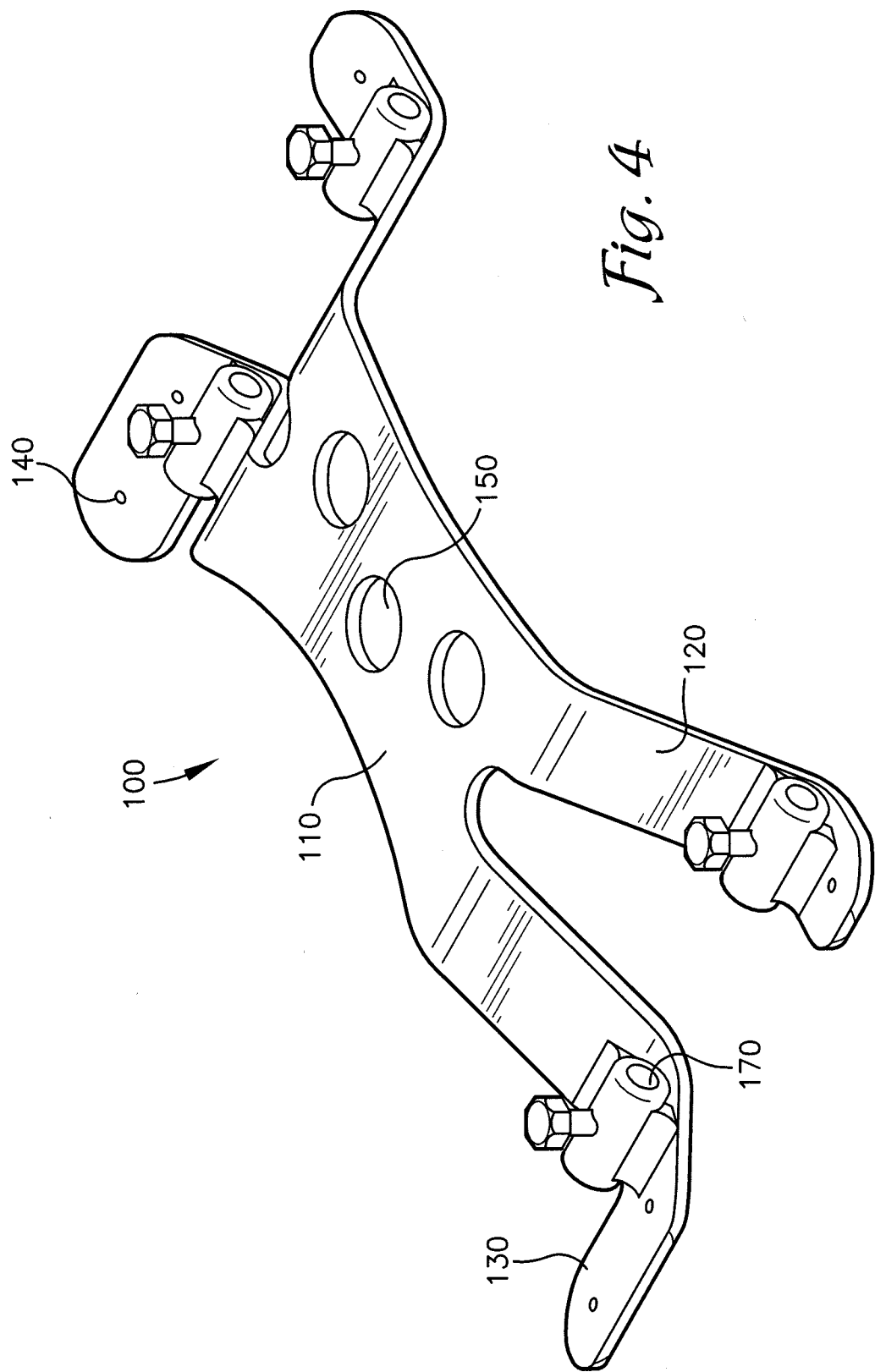
FIG. 4 is a perspective view of an embodiment of the bracket with support rail coupling members.

Individual brackets can be further strengthened and transformed into an interconnected cable bracketing system by utilizing rigid support rails to attach multiple brackets in series. In FIG. 4, the embodiment of the bracket 100 disclosed herein, and as shown in FIG. 1, is shown in perspective view with support rail coupling members 170 attached to the bracket 100 between the distal end of the leg 130 and the leg 120.

Figure 5:
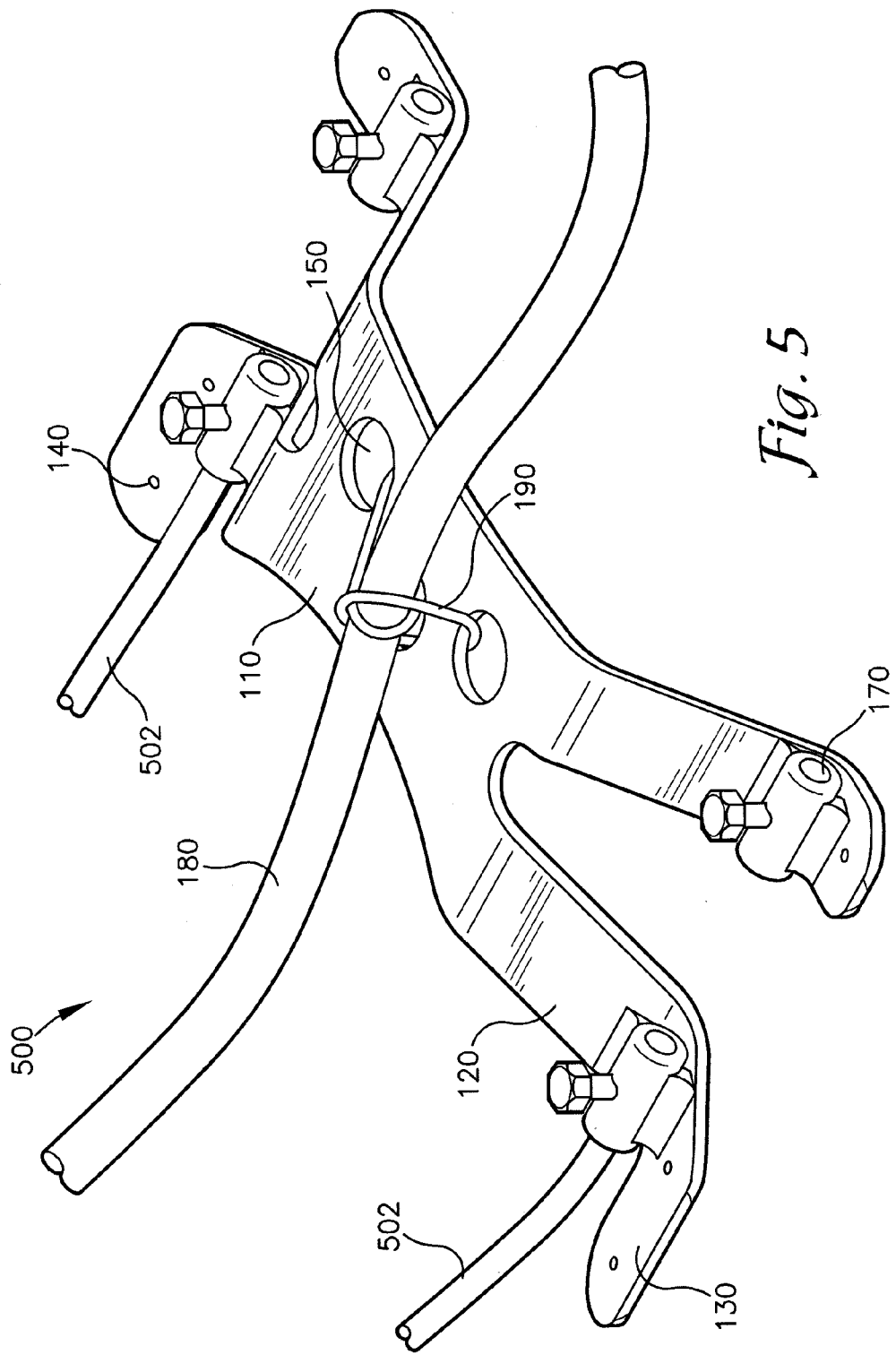
FIG. 5 is a perspective view of an embodiment of the bracket depicting a cable secured to the bracket.

In FIG. 5, an embodiment of the cable mounting system 500 is shown as it pertains to one bracket 100. The support rails 502 are secured to the bracket 100 by support rail coupling members 170, which are attached to the bracket 100 between the distal end of each leg 130 and the leg 120 of the bracket 100. A cable 180 is attached to the bracket 100 by fastening devices 190 attached to the bracket by utilizing the holes 150 in the center panel 110.

Figure 6:
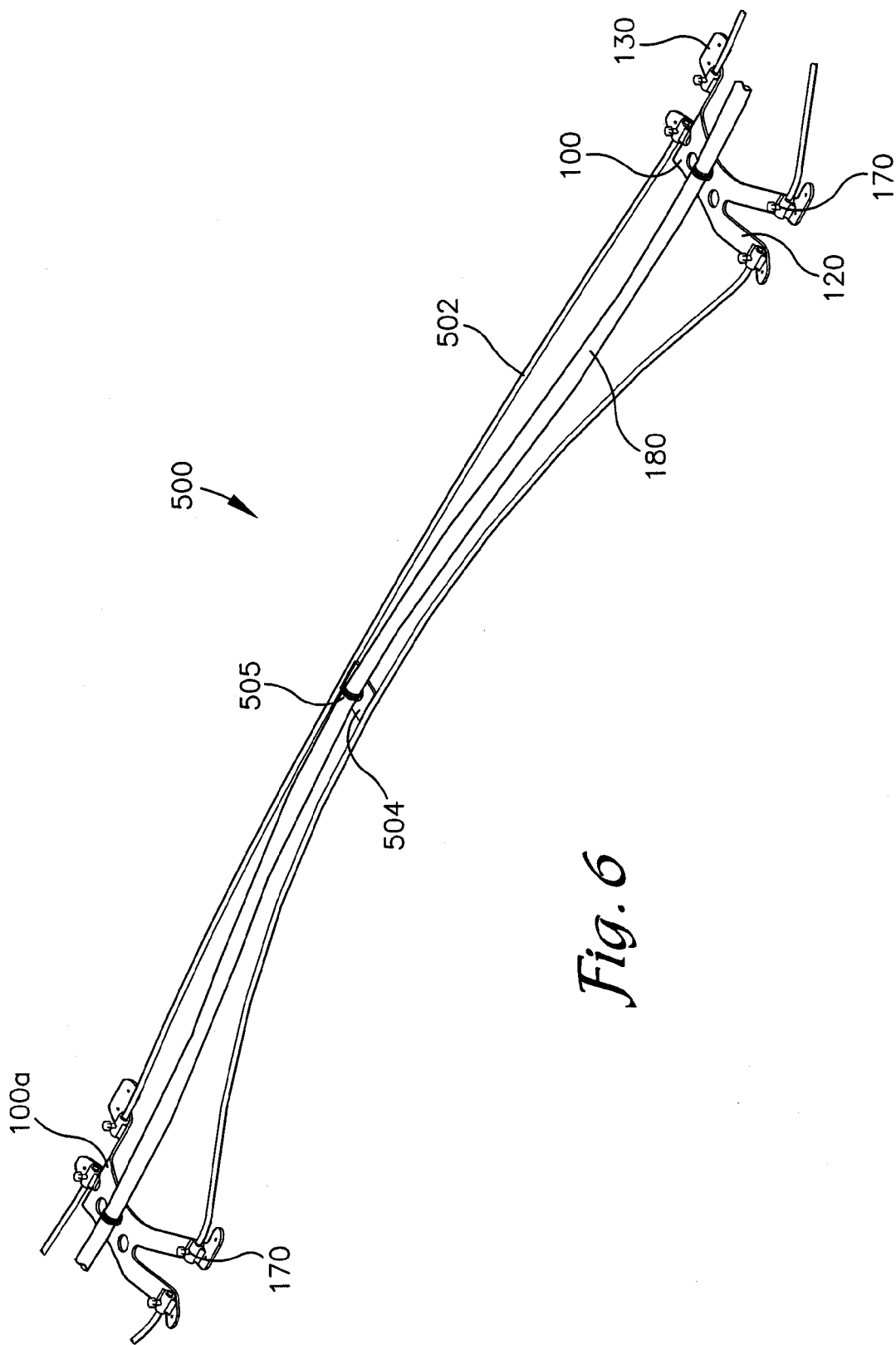
FIG. 6 is an embodiment of the cable mounting system.
Figure 7:
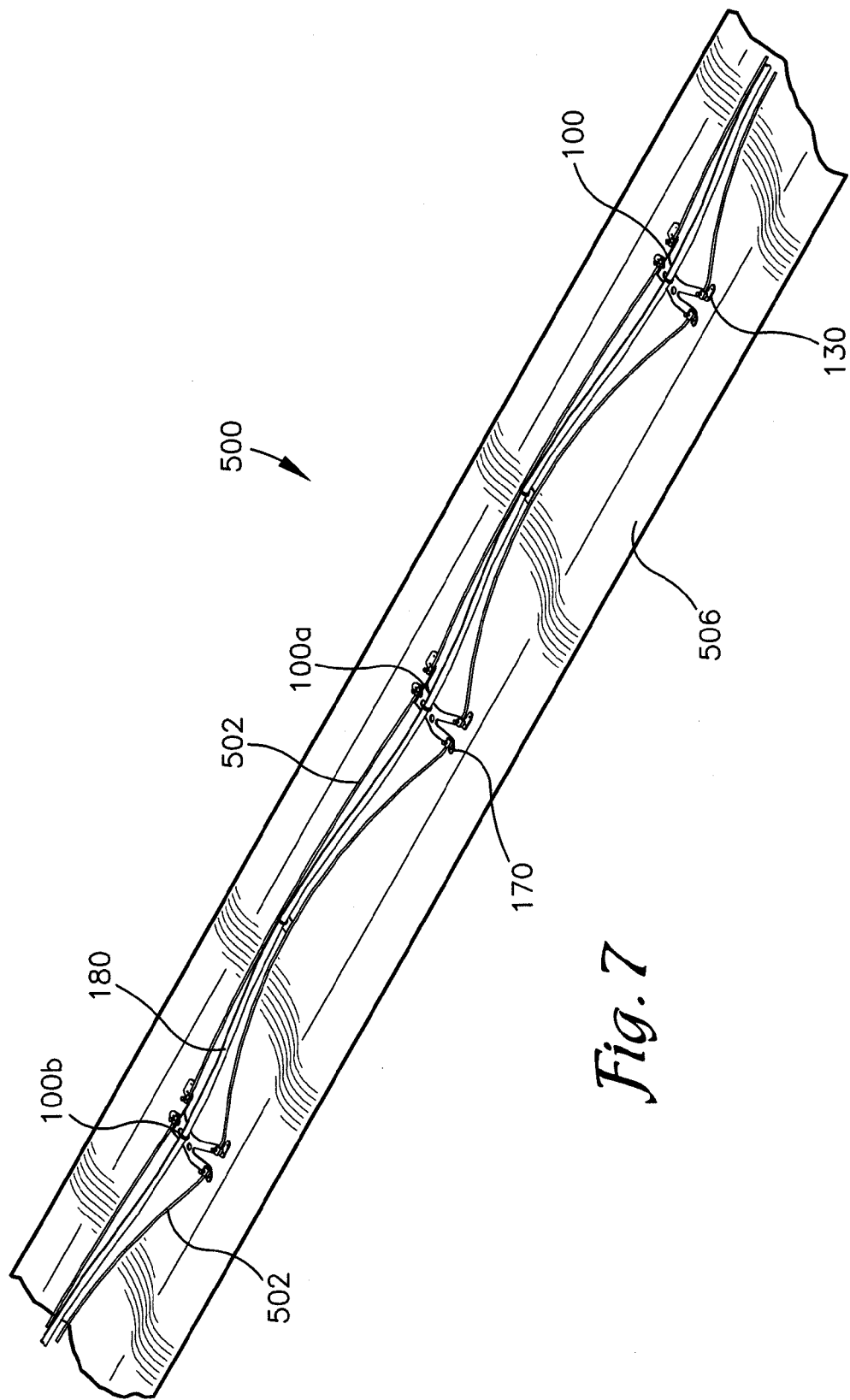
FIG. 7 is an embodiment of the cable mounting system employing support rails.

As shown in FIG. 6, an embodiment of the cable mounting system 500 is depicted as it applies to two brackets. The support rails 502 are secured to the bracket 100 through support rail coupling members 170. A cable 180 is attached to the bracket 100. The support rails 502 arc away from the structure to which the bracket 100 is attached and converge at the middle of the support rail 502 to attach to a support rail platform 504. The cable 180 is attached to the support rail platform 504 by a fastening device 505 for the purpose of securing the cable 180. The fastening device 505 could be a cable clamp, bolt, flexible fasteners such as zip ties, or other fastening device used to secure components. The support rail platform 504 provides cable stability and prevents the cables 180 from flailing under wind loads. The support rails 502 then arc back towards the structure and secure at the support rail coupling members 170 on the next bracket 100a. As shown in FIG. 7, this cable mounting system 500 can continue for the entire traverse of the structure 506 to which the brackets 100, 100a, and 100b are attached.

The system 500, like the brackets 100, also has low aspect ratio to decrease the moment arm and increase the likelihood of the brackets 100 staying secured to the structure 506 when external forces are applied to the individual brackets 100 and the cable mounting system 500. Interconnecting the brackets can create improved grounding capability.

The cable mounting system 500 further helps to keep the cables 180 away from the structure's surface 506. Doing so provides several benefits such as reducing cyclic flexing of the cables. This reduces the likelihood of internal failure of the cable from cyclic internal stresses and also reduces contact abrasion between the cables and the underlying surface. This also facilitates the maintenance of the high performance coating materials used on many elevated steel structures. The distal end of the leg 130 may also be coated with a high performance corrosion resistant material.

Figure 8:
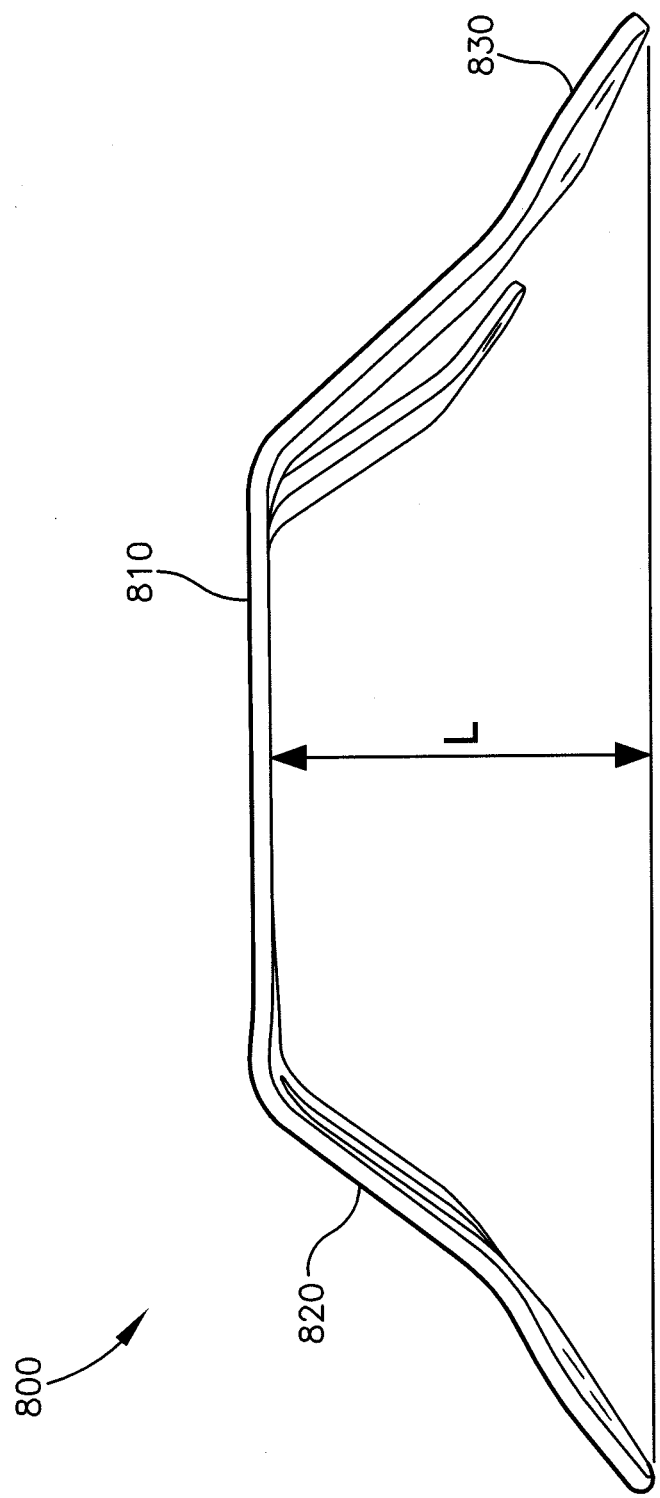
FIG. 8 is a perspective view of an embodiment of the bracket depicting the aspect ratio.

As seen in FIG. 8, an embodiment of the bracket 800 disclosed herein has a low aspect ratio. The aspect ratio is determined by the distance between the two distal ends of the leg 830 and the distance L, or the moment arm, between a surface and the center panel 810 of the bracket 800. This aspect ratio is between 15% and 75%. The distance L can be decreased by further extending the legs 820 and distal end of the legs 830. In FIG. 8, the bracket 800 is depicted as resting on a flat surface. In another embodiment, the surface may be curved to match the curvature of the distal end of the legs 830. This would further decrease the distance L between the center panel 810 and the surface.

FIG. 9 is an alternative embodiment of the bracket 900 comprised of a center panel 910, two legs 920 that extend outwardly and downwardly from the center panel 910, magnetic pads 940 attached to the distal end of the legs 930, and a hole in the center panel 950. The hole in the center panel has a diameter in the range of 0.25 to 0.85 inches. FIG. 10 is an alternative embodiment of the bracket 900 comprised of a center panel 910, two legs 920 that extend outwardly and downwardly from the center panel 910, magnetic pads 940 attached to the distal end of the legs 930, and a hole in the center panel 950. In one embodiment the bracket 900 is oval-shaped. FIG. 11 is an alternative embodiment of the bracket 900 comprised of a center panel 910, two legs 920 that extend outwardly and downwardly from the center panel 910, magnetic pads 940 attached to the distal end of the legs 930, and a hole in the center panel 950. In this embodiment the bracket 900 is triangular. Additionally, there is a magnetic pad 940 attached where the triangle comes to a point in the center panel 910.

Although the invention has been described above with reference to one or more preferred embodiments, it will be appreciated that various changes or modifications may be made without departing from the scope of the invention as defined in the appended claims.

I claimed:

1. A bracket for securing components to a surface of a structure with a radius of curvature, the bracket comprising;
    a center panel;
    at least two legs extending outwardly and downwardly from the center panel and terminating at a distal end wherein a curvature of the distal end of the at least two legs is matched to the radius of curvature of the structure to which the bracket is to be secured;
    at least one hole in the center panel for securing a component to the bracket; and
    at least one magnetic pad secured to each distal end of the at least two legs, wherein due to the curvature of the at least two legs a surficial contact of each magnetic pad with the surface of the structure is maximized and the holding power of the bracket to the surface is optimized.

2. The bracket of claim 1, wherein the bracket has an aspect ratio of at least 15%.

3. The bracket of claim 2, wherein each distal end of the at least two legs are oppositely disposed across the center panel in order to enhance stability of the bracket when secured to the structure.

4. The bracket of claim 2, wherein the at least one hole in the center panel has a diameter in a range from 0.25 to 0.85 inches.

5. The bracket of claim 2, wherein the magnetic pads comprise a magnet with a contact surface fitted into a socket.

6. The bracket of claim 5, wherein the magnetic pads individually maintain a pull force of at least 60 lbs.

7. The bracket of claim 6, wherein the magnetic pads are secured to the distal end of the at least two legs.

8. The bracket of claim 6, wherein a rim of the socket and the contact surface of the magnet are in tangential contact with the surface of the structure.

9. The bracket of claim 1, wherein at least 50% of the distal end of the legs of the bracket are in contact with the structure.

10. The bracket of claim 1, wherein the distal end of the legs of the bracket engage the surface of the structure in a tangential line of contact.

11. The bracket of claim 1, wherein the bracket is fabricated from 10 gauge stainless steel.

12. The bracket of claim 1, wherein the at least two legs are four legs.

13. The bracket of claim 1, wherein there is at least one hole in each of the at least two legs for securing components to the bracket.

14. The bracket of claim 1, wherein the components mounted to the bracket and secured to the structure are conduits and cables.

15. The bracket of claim 1, wherein the components are secured to the bracket using clamps.

16. A system for securing at least one cable to a surface of a structure, the structure having a radius of curvature, the system comprising; first and second brackets separated by a distance, the first and second brackets comprising:
    a center panel;
    at least two legs extending outwardly and downwardly from the center panel and terminating at a distal end wherein a curvature of the distal end of the at least two legs is matched to the radius of curvature of the structure;
    at least one hole in the center panel for securing a component to the bracket; and
    at least one hole in the distal end of the at least two legs for securing the bracket to the structure, wherein due to alignment of the curvature of the distal end of the at least two legs with the curvature of the structure a surficial contact of the distal end of the at least two legs with the structure is maximized;
    at least one support rail with first and second ends wherein the support rail is curved to arc away from the structure and is secured through sockets attached to and underneath the center panel of the bracket, the first end of the support rail secured to the first bracket and the second end of the support rail secured to the second bracket; and
    a cable secured to the rail and the first and second brackets.

17. The system for securing at least one cable to a surface of a structure of claim 16, wherein a low aspect ratio of the bracket readily accommodates the installation of a ladder rung secured to the surface of the structure at least seven (7) inches away from the back of the ladder rung.

\* \* \* \* \*